(12) United States Patent
Payton et al.

(10) Patent No.: US 6,885,303 B2
(45) Date of Patent: Apr. 26, 2005

(54) MOTION PREDICTION WITHIN AN AMORPHOUS SENSOR ARRAY

(75) Inventors: David W. Payton, Calabasas, CA (US); Regina I. Estkowski, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 148 days.

(21) Appl. No.: 10/369,219

(22) Filed: Feb. 15, 2003

(65) Prior Publication Data

US 2003/0233211 A1 Dec. 18, 2003

Related U.S. Application Data

(60) Provisional application No. 60/357,777, filed on Feb. 15, 2002.

(51) Int. Cl.[7] .............................................. G08B 13/00
(52) U.S. Cl. .................. 340/565; 340/825.49; 340/541; 701/300
(58) Field of Search ................................ 340/565, 541, 340/540, 545.3, 545.4, 539.19, 825.49, 506, 556, 539.21, 539.23; 702/150; 701/200, 207, 204, 300; 709/242; 367/93, 94

(56) References Cited

U.S. PATENT DOCUMENTS

| | | | |
|---|---|---|---|
| 4,028,533 A | | 6/1977 | Matsubara |
| 5,233,604 A | | 8/1993 | Ahmadi et al. |
| 5,561,790 A | | 10/1996 | Fusaro |
| 5,675,741 A | | 10/1997 | Aggarwal et al. |
| 5,946,083 A | | 8/1999 | Melendez et al. |
| 5,991,300 A | | 11/1999 | Tappan |
| 6,154,139 A | | 11/2000 | Heller |
| 6,195,020 B1 | | 2/2001 | Brodeur, Sr. et al. |
| 6,208,247 B1 | * | 3/2001 | Agre et al. ............ 340/539.19 |
| 6,311,129 B1 | | 10/2001 | Lin |
| 6,707,486 B1 | * | 3/2004 | Millet et al. ................. 348/155 |
| 6,735,630 B1 | * | 5/2004 | Gelvin et al. ............... 709/224 |
| 6,771,173 B1 | * | 8/2004 | Clayton et al. .......... 340/573.1 |
| 2004/0036603 A1 | * | 2/2004 | Bingham ..................... 340/541 |

OTHER PUBLICATIONS

D. W. Gage, "Command and Control for Many–Robot Systems", In the Nineteenth Annual AUVS Technical Symposium (AUVS–91), Huntsville, AL, Jun. 22–24, 1992, Reprinted in Unmanned Systems Magazine,10(4):28–34, Fall 1992.

D. W. Gage, "Many Robot Systems", SPAWAR web page, http://www.nosc.mil.robots/research/manyrobo/many-robo.html.

\* cited by examiner

*Primary Examiner*—Jeffery Hofsass
*Assistant Examiner*—Eric Blount
(74) *Attorney, Agent, or Firm*—Tope-McKay & Associates

(57) ABSTRACT

A method, apparatus, and computer program product are presented for detecting motion within an amorphous sensor node array. The operations performed include detecting an object at a node in the array, with a node that detects an object termed a "detecting node". Another operation includes sensitizing nodes about the detecting node to the possibility that the object will move toward the sensitized nodes. Still another operation includes, when the object moves toward a sensitized node, detecting the object at the sensitized node and propagating a warning signal to a distance from the sensitized node in the direction of the motion of the object. In another aspect, nodes are differentiated into a pattern comprising pattern elements, where each pattern element comprises at least one node, wherein the pattern is used to determine which nodes are sensitized about a detecting node and to determine a propagation direction for the warning signal.

120 Claims, 9 Drawing Sheets

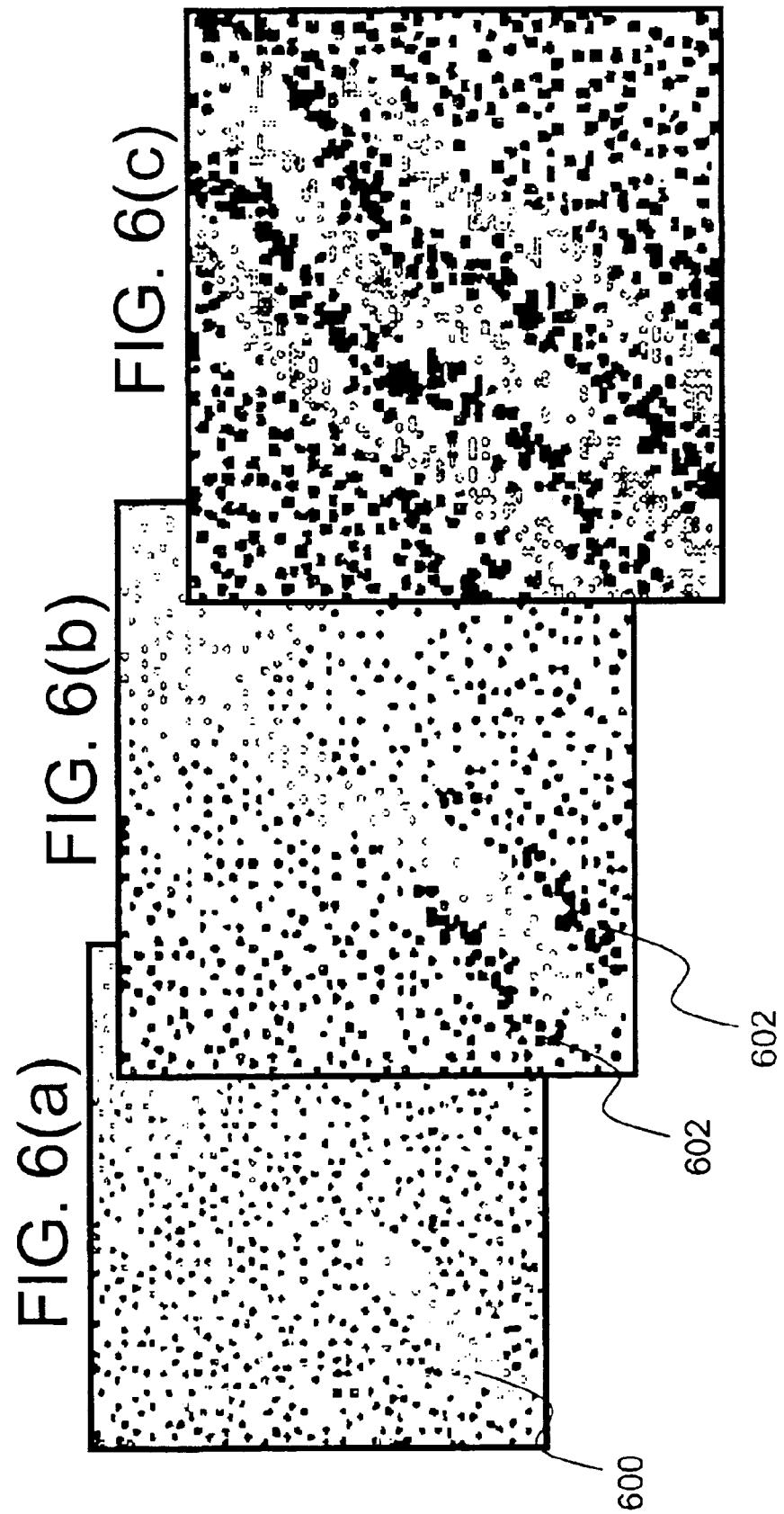

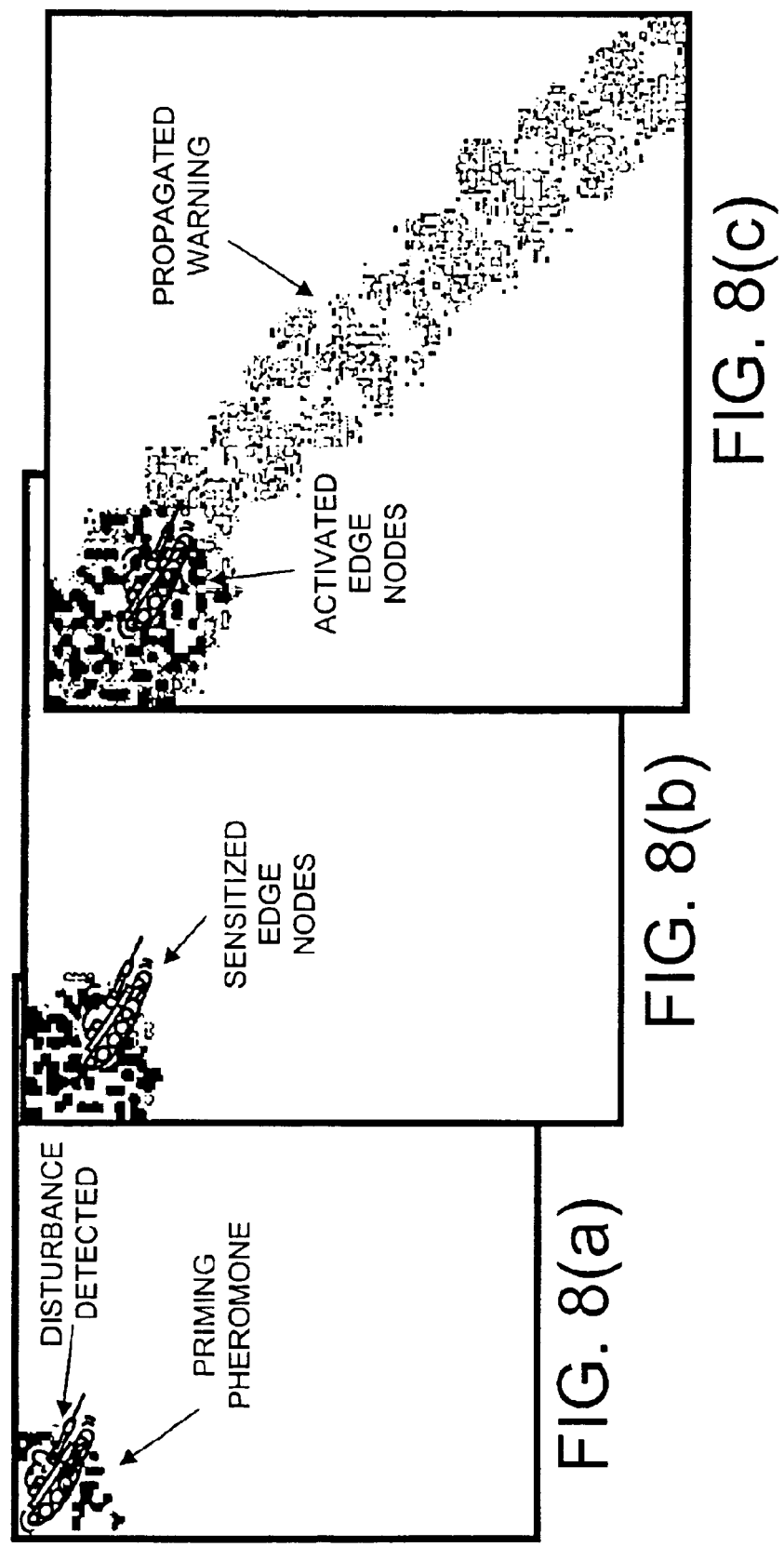

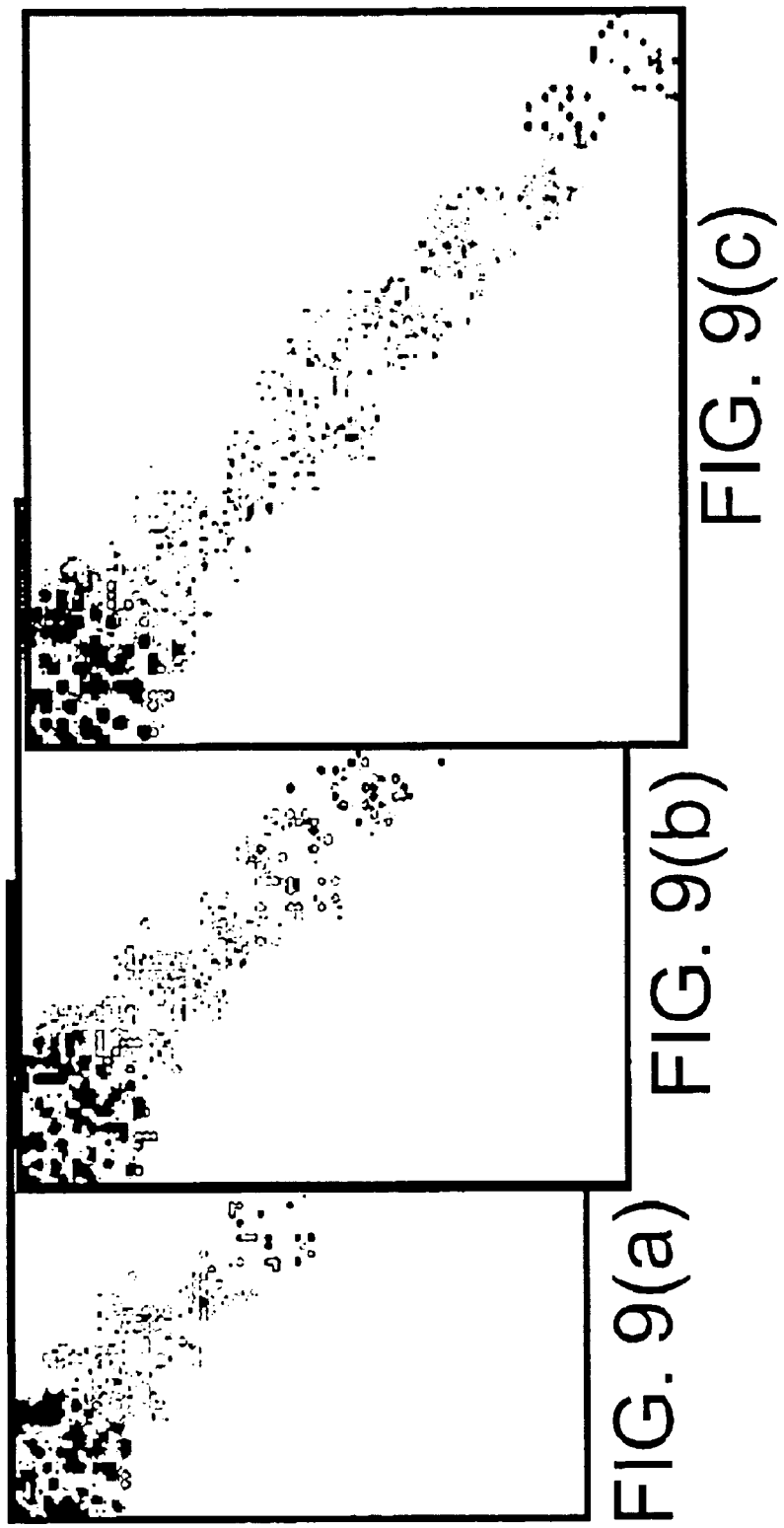

MOTION PREDICTION WITHIN AN AMORPHOUS SENSOR ARRAY

PRIORITY CLAIM

This application claims the benefit of priority to provisional application No. 60/357,777, filed in the United States on Feb. 15, 2002, and titled "Amorphous Motion Sensing".

BACKGROUND OF THE INVENTION (1) Technical Field

The present invention relates to techniques for communications within distributed networks of sensor nodes. More specifically, the present invention relates to a technique for predicting the movement of an object through a network of sensor nodes.

(2) Discussion

Over the past several decades, the electronic communications field, particularly in the area of wireless communication, has exploded. As such, the abilities of small processing devices have increased considerably while the cost of these devices has decreased. Wireless communication generally takes place between specific devices or nodes. In order to perform tasks such as developing routes through a network, it is generally necessary to provide each member of a network with a unique identity so that specific devices can communicate. For example, in a cellular network or even in an ad-hoc network, a unique identity or address is assigned to each device so that it may exclusively receive calls targeted to its address. In addition, communications in most networks also require a "handshake" or mutual acknowledgement that a call or communication is to be set up. These networks depend on physical reliability in order function properly. Various communication properties are used in monitoring the performance of individual links in the network in order to adjust parameters of the communication system to maximize its effectiveness.

With the increased computational abilities and reduced cost of small, relatively simple devices comes the need for additional communication schemes that do not rely on the need for specific address assignments and complex communication acknowledgement schemes. It is desirable that these communication schemes take advantage of the processing capability of modem devices while conserving power by using local communications. More particularly, there exists a need in the art for a set of nodes (connected in either a wired or wireless fashion) that take advantage these local communication schemes in order to form a motion detection and prediction array.

SUMMARY OF THE INVENTION

The present invention provides a method, an apparatus, and a computer program product for detecting motion within an amorphous sensor node array. In a first aspect, operations of the present invention include:

detecting an object at a node in the array, with a node that detects an object termed a "detecting node";

sensitizing nodes about the detecting node to the possibility that the object will move toward the sensitized nodes; and when the object moves toward a sensitized node, detecting the object at the sensitized node and propagating a warning signal to a distance from the sensitized node in the direction of the motion of the object.

Another aspect of the present invention includes an operation of differentiating the nodes into a pattern comprising pattern elements. Each pattern element comprises at least one node, and the pattern is used to determine which nodes are sensitized about a detecting node as well as to determine a propagation direction for the warning signal.

In a still further aspect, the operation of differentiating the nodes into a pattern is performed by differentiating a plurality of nodes into a plurality of differently oriented, overlapping sets of substantially parallel linear bands. Each set of substantially parallel linear bands havs a repeated band arrangement of N ordered bands, with the aggregate forming a mesh pattern including mesh points defined by intersections of linear bands from differently oriented overlapping sets. Mesh points having common band combinations are considered mesh points with nodes of a particular state. Also, the operation of detecting an object at a node in the array is performed for determining when an object enters a mesh point in the sensor node array. Further, the operation of sensitizing nodes is performed by propagating a sensitizing signal from nodes in the mesh point at which the object was detected to cause nodes in mesh points having states different from the state of the propagating mesh point within a distance of the propagating mesh point to become sensitized. Still further, the operations of detecting an object at a sensitized node and propagating a warning signal are performed by detecting when the object enters a sensitized mesh point, and propagating a warning signal along nodes in a linear band that crosses the sensitized mesh point the object entered and that is substantially aligned with the motion of the object, so that the warning signal is propagated to a distance from the mesh point in the general direction of the object's travel.

In yet a further aspect, in the operation of sensitizing nodes, the sensitized nodes record the state of the mesh point that sent the sensitizing signal. In the operation of detecting an object at the sensitized node, the sensitized node propagates a warning signal that includes a pheromone determined by a combination of the state of the node that sent the sensitizing signal and the state of the sensitized node. In the operation of propagating a warning signal, nodes that contain either the state of the node that sent the sensitizing signal or the state of the sensitized node become warning nodes, retransmitting the warning signal with a decay factor so that the initial strength of the warning signal determines the distance to which the warning signal is propagated.

In another aspect, the operations further comprise determining a persistence measure for an object moving through the array, with the persistence measure being indicative of the distance of the object's travel along a particular linear band, and determining an initial strength for the warning signal to be propagated from the mesh point based on the persistence measure for the object, thereby varying the at least one parameter of the warning signal, with the parameter selected from a group consisting of a propagation distance of the warning signal and a warning intensity of the warning signal.

In still another aspect, the present invention further comprises an initial operation of selecting a subset of nodes in the array that are substantially evenly spaced with respect to each other for the differentiating step.

In a further aspect, the present invention comprises an operation of detecting an object type.

In a yet further aspect, the present invention comprises an operation of adjusting parameters of the steps of detecting, sensitizing, and propagating are adjusted for the particular object type.

In one more aspect, the present invention comprises an operation of adjusting the pattern based on the object type.

In another aspect, the pattern is a three-dimensional pattern.

In an additional aspect, nodes receiving a warning signal activate an action mechanism based on the warning signal.

BRIEF DESCRIPTION OF THE DRAWINGS

The objects, features and advantages of the present invention will be apparent from the following detailed descriptions of the preferred aspect of the invention in conjunction with reference to the following drawings.

FIGS. 6(a), (b), and (c) are illustrative diagrams of a network of nodes showing the creation of a first set of bands within a network of nodes;

FIGS. 8(a), (b), and (c) are illustrative diagrams of a network of nodes the object detection/sensitization node behavior; and FIGS. 9(a), (b), and (c) are illustrative diagrams of a network of nodes showing the warning/reinforcement behavior.

DETAILED DESCRIPTIONS

Figure 1:
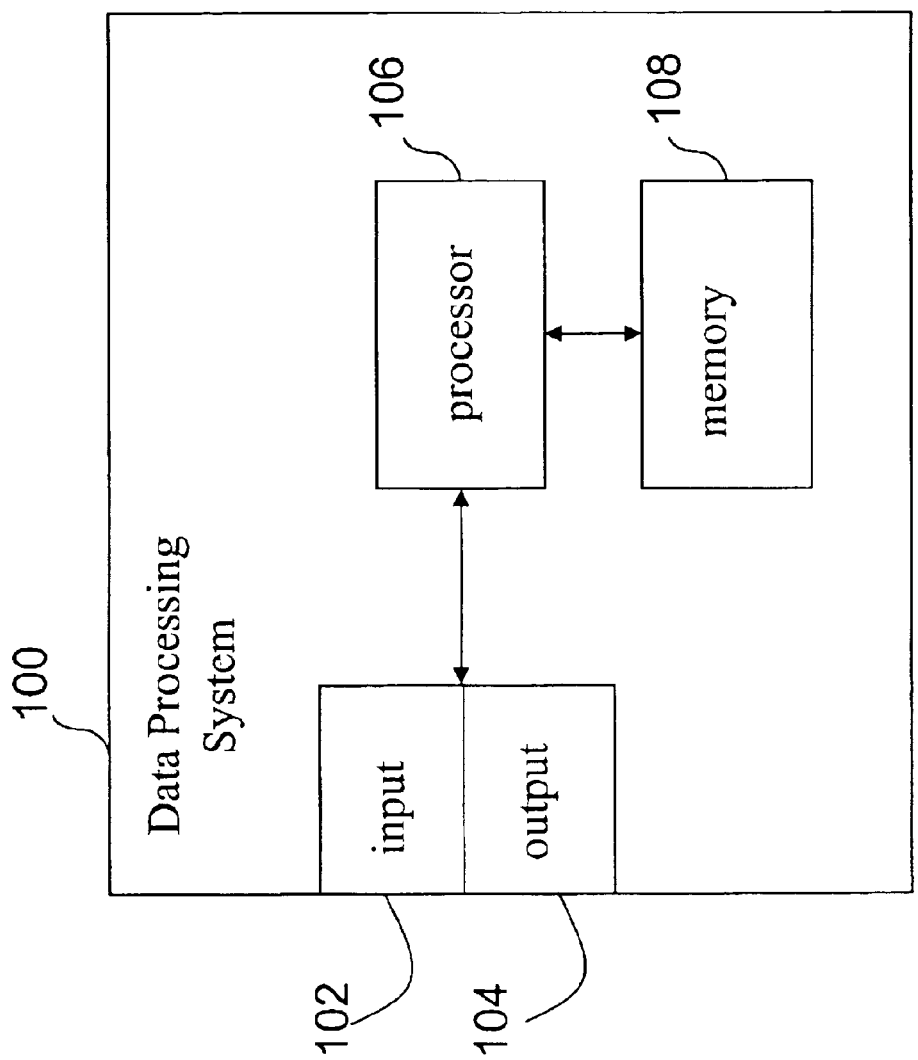
FIG. 1 is a block diagram of a data processing system used in conjunction with the present invention.

The present invention relates to techniques for communications within distributed networks of sensor nodes. More specifically, the present invention relates to a technique for predicting the movement of an object through a network of sensor nodes. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Action Mechanism—An action mechanism is a general term for a device that the node operates in response to an object's motion. For example, in the case of the use of nodes in a lighting system, nodes may each be furnished with a light that is activated as an object approaches to within a predetermined distance from the node. It will be appreciated by one of skill in the art that a wide variety of action mechanisms may be provided, non-limiting examples of which include those for performing a visually detectable action such as the lights just mentioned, for performing an auditory action such as turning on an alarm to alert those in the direction of an someone approaching, and performing a scent-based action such as releasing an air freshener into the air in front of someone approaching, thereby creating a more pleasant environment.

Distance Measure—The term distance measure generally indicates the distance from a node that detects an object to a current node. The distance measure may be determined exactly by using an accumulation of signal degradation as the signal is "hopped" from node to node. A simpler distance measure would be a simple hop count, e.g. the number of links between nodes a signal traverses along a path from a detecting node and a current node.

Local—The term local as used herein is intended to be indicative of a close range, the exact distance of which varies with the needs of a particular application. Most often, local indicates that communication between nodes is limited to nearby nodes such as those immediately neighboring a node. Depending on the level of node congestion, the physical range at which nodes are considered to be local with respect to one another may be varied by altering transmission power or receiving sensitivity. This can, for example, prevent a node from losing contact with the other nodes by extending the communication range of that node. On the other hand, it can also prevent packet collisions from excessively disrupting communications by reducing the communication ranges of a group of nodes.

Means—The term "means" as used with respect to this invention may vary with context. In some cases, it indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium. In other cases, the "means" may indicate a physical mechanism/machine for performing a useful function. In other context, means can also refer to other functional hardware mechanisms.

Node—As utilized herein, the term node indicates a unit comprising, in its most general sense, a sensor for detecting the presence of an object in an area about the node and a signal receiver/transmitter used to receive and propagate a signal for determining the distance between the node and another node that detected an object (or to originate such a signal if the node is the detecting node). Generally a node includes a processor for operating software for facilitating the functions discussed herein. For example, software may provide a means for determining the difference in distance measurements from different detecting nodes as an object moves through a network of nodes, and based on the difference, the node can determine whether it is in front of the object as it is moving. A memory is also included in the node for storing distance information from a received signal. Assuming that the node operates on digital data, an analog to digital converter can be provided to generate a digital representation of the strength of incoming signals. Nodes may also include many other features such as additional sensors for detecting properties of the environment and additional communication mechanisms as well as mechanisms to provide mobility. The nodes also generally include an action mechanism, as defined above.

Pheromone—The term pheromone as used herein generally indicates a mechanism for providing information from node to node, and as such is a mechanism for classifying nodes. Pheromones may be generated by providing values for variables in a software program, or could be generated by physical mechanisms, non-limiting examples of which include chemicals or colors.

Signal Transmitter/Receiver—A signal transmitter/receiver for use with the present invention desirably, but not necessarily, uses a communication medium exhibiting qualities including an intensity that decreases with increased distance from the sender such that it may be used effectively for distance estimation. Examples of mediums satisfying these criteria include optical, acoustic, and radio frequency signals. A particularly desirable medium is infrared radiation.

(2) Physical Aspects

The present invention has three principal "physical" aspects. The first is a node or a system of nodes. Each of the nodes includes a sensor for detecting the presence of an object, and is typically in the form of a computer system operating software or in the form of a "hard-coded" instruction set. This system may be incorporated into a wide variety of devices that provide different functionalities. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

A block diagram depicting the components of a computer system used in a node of the present invention is provided in FIG. 1. The data processing system 100 comprises an input 102 for receiving information from at least one sensor for use in detecting, and possibly classifying, objects in an area around the node. Note that the input 102 may include multiple "ports." Typically, input is received from at least one sensor, non-limiting examples of which include infrared/electromagnetic radiation sensors, acoustic sensors, and others. An output 104 is connected with the processor for providing information regarding the presence and/or identity of object(s) to other systems in order that a network of computer systems may serve as a motion prediction system. Output may also be provided to other devices or other programs, e.g. to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
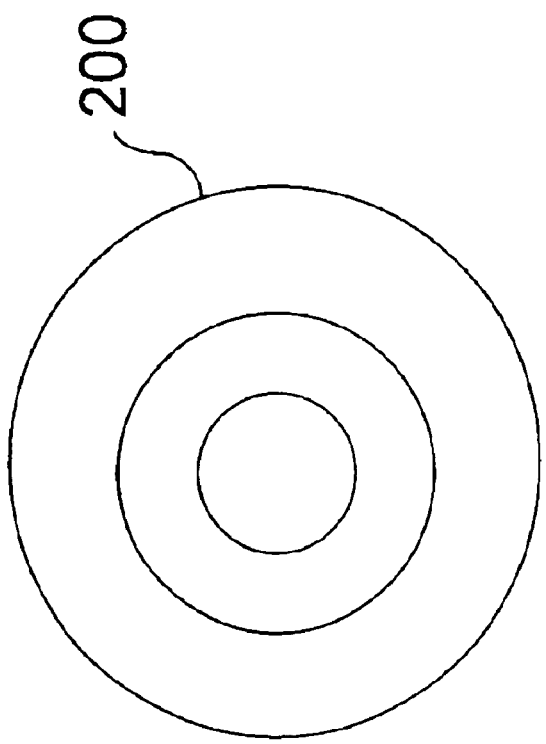
FIG. 2 is an illustrative diagram of a computer program product aspect of the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

Figure 3:
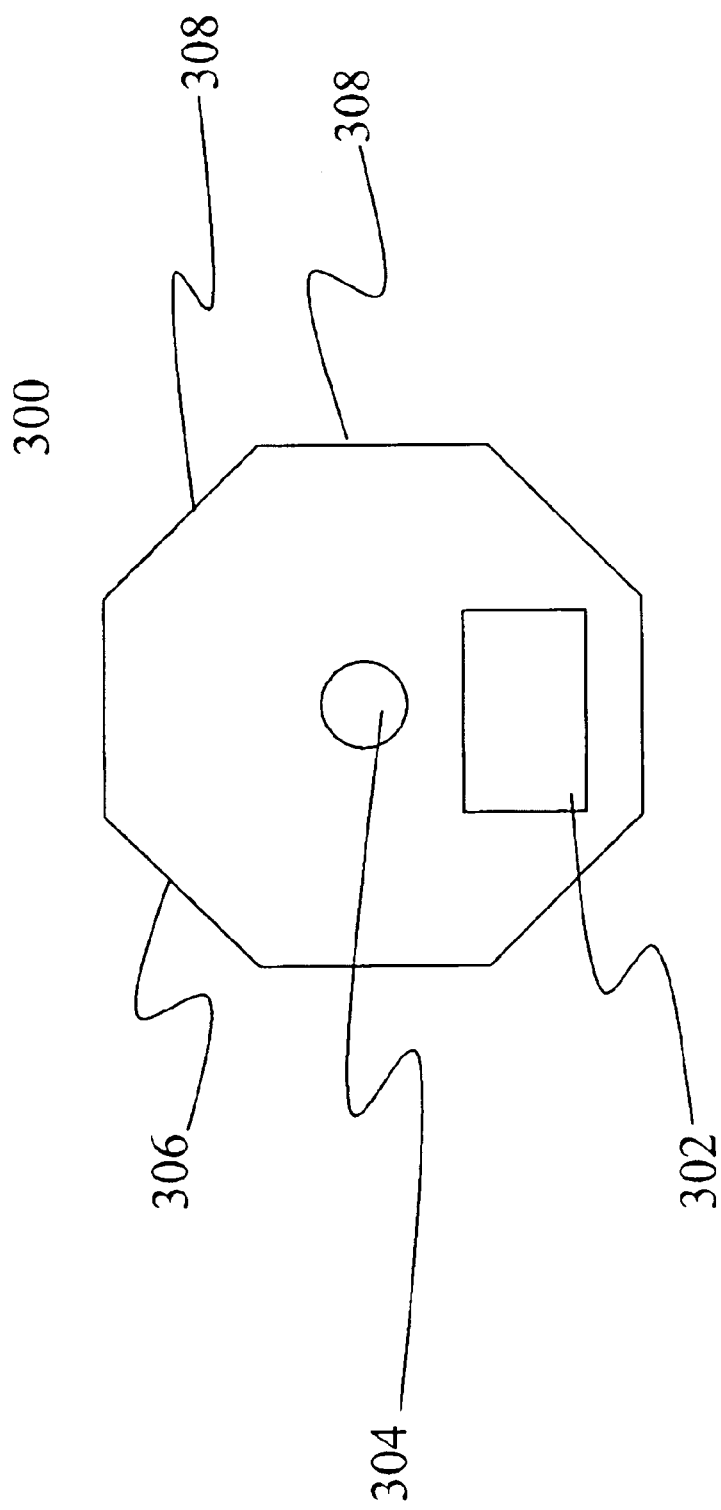
FIG. 3 is an illustrative diagram of a node aspect of the present invention.

An example of a simple node depicted in FIG. 3. As shown, the node 300 includes a data processing system 302 and a signal transmitter/receiver 304. The signal transmitter/receiver 304 is depicted in the figure as an omni directional transmitter/receiver, but may be configured directionally if desired. A sensor 306 is depicted as an infrared sensor having a plurality of angular regions 308 for detecting an object in an area about the node 300.

(3) Introduction

The present invention provides a technique for detecting objects moving through an area covered by an amorphous sensor network. Such a network is capable of detecting current movement and of predicting future movement of objects. The nodes of the network include sensors that may have no information regarding their absolute position and orientation or about their orientation with respect to neighboring nodes. The network is capable of providing notice regarding the approach of a moving object along its predicted path. Thus, a few of the capabilities of a network of the present invention include:

Ability to estimate the current movement direction of an object moving across the area that is monitored by the sensor system.

Ability to obtain a predicted movement direction of an object moving across the area that is monitored by the sensor system.

Ability for sensors near the predicted path of an object moving across the area that is monitored by the sensor system to give notification that a monitored object is predicted to pass nearby.

The invention uses a virtual pattern that emerges within the sensor system through specially designed interactions between locally communicating sensor nodes. This results in a pattern state within individual nodes that either sensitizes or desensitizes the nodes to particular activation/inhibition signals from neighboring nodes. In one manifestation, a set of local interaction rules are used that lead to node differentiation along parallel spatial bands, resulting in a grid-like band pattern. Activation/inhibition rules are designed such that messages signaling the presence of an intruder are inhibited along bands of the same type, but are propagated into bands of a different type. The observation state of the sensor nodes is used to assure that signal propagation only occurs in the direction of an object's motion and does not propagate to nodes that have already seen the object. This, in effect, leads to a form of moving edge detection for objects traversing the sensor array from one spatial band to another. This provides a purely distributed means of computing the direction and likely destination of an incoming intruder, with no need for centralized data analysis or explicit sensor data fusion.

Thus, the present invention is capable of using sensor nodes that are extremely small, cheap, and simple, and that are deployed somewhat haphazardly or randomly. Nodes can potentially be as small as dust particles, and may be distributed, for example, in large quantities in the air or in a liquid medium. Networks incorporating such small nodes are likely to have very limited computation capabilities and are unlikely to have sophisticated on-board position location capabilities such as a global positioning system (GPS). The present invention can utilize such a network to provide effective motion prediction capability by exploiting the distributed processing afforded by many sensor nodes, rather than relying on more sophisticated computation within a subset of the sensor nodes. The present invention, of course, is not limited to situations involving such limited computation capability.

The present invention is capable of taking advantage of signaling mechanisms presented in co-pending U.S. patent application Ser. No. 09/921,295, titled "Method and Apparatus for Signaling Among a Plurality of Agents," by Payton et al., incorporated herein by reference in its entirety.

(4) Discussion

The basic motion detection concept is that amorphous nodes are able to differentiate into different states to form a detection pattern. As an object enters the pattern, nodes near the object become sensitized, forming a perimeter (detection edge) about the object. As the object approaches a sensitized node, the sensitized node transmits an alert signal in the direction of the object's motion. This process repeats itself as the object moves. The alert signal may be strengthened as the object continues to move in the same direction, as an indication of the persistence of the object's movement in that direction.

For illustrative purposes, and for clarity of explanation, the amorphous nodes will be depicted herein as differentiating into linear bands. Although linear bands are used for illustration, it will be readily apparent to those of skill in the art that a wide variety of other geometric patterns can be used, and that the concepts discussed can be readily adapted for both two and three-dimensional environments.

An example of nodes differentiating into linear bands is depicted in FIGS. 1(a) and 1(b). In the figure, in each direction, nodes are differentiated into two band "types" in each direction, as shown by elements 100, 102, 104, and 106. As shown by the arrow in the center of each figure, the motion of the object is detected as it crosses the boundary of bands in FIG. 1(a), while it is not detected as it moves parallel to the bands in FIG. 1(b). Thus, objects that cross bands trigger detection in the direction orthogonal to the bands, and bands that are oriented in the direction of motion direct the warning messages.

In order to initialize the network, first, for example, a virtual pattern is generated in the array of nodes. This process is carried out in two basic steps, with an optional preliminary step. First, a gradient is diffused through the nodes. Second, bands are generated through the nodes. In the optional step, a subset of nodes that have a more uniform distribution than the distribution of all of the nodes in the network. In this case, all later steps are restricted to this subset to potentially enable the generation of a more even pattern.

A. Illustrations

This section provides illustrations of the various operations just mentioned in order to provide a better understanding of their operation prior to discussing how they are performed.

Optional "Even-Out" Operation—Given a sensor array of randomly dispersed nodes, a more uniformly distributed subset is selected to generate a better gradient. FIG. 2(a) shows a set of randomly spaced nodes, and FIG. 2(b) shows a set of nodes in which a uniformly-spaced subset of the nodes are activated.

Figure 4:
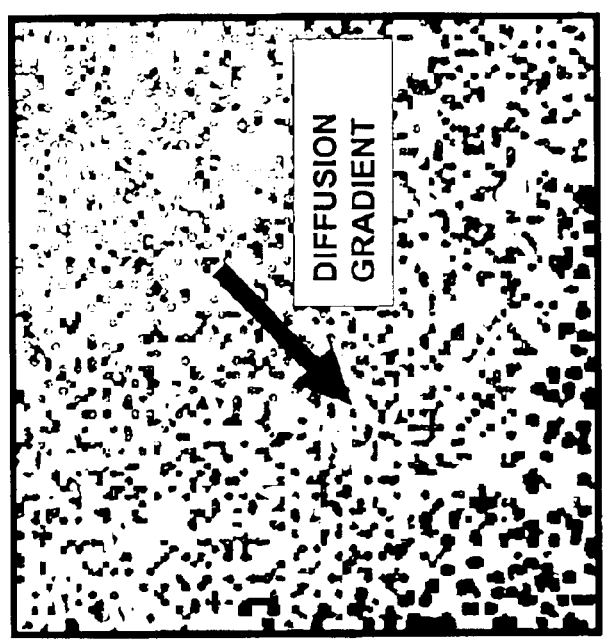
FIG. 4 is an illustrative diagram of a network of nodes showing the diffusion of a gradient in the network.

Gradient Diffusion Operation—As exemplified in FIG. 4, after the optional "even-out" operation, a circular gradient is radiated out from a selected node through the subset of nodes found in the previous step.

Figure 5B:
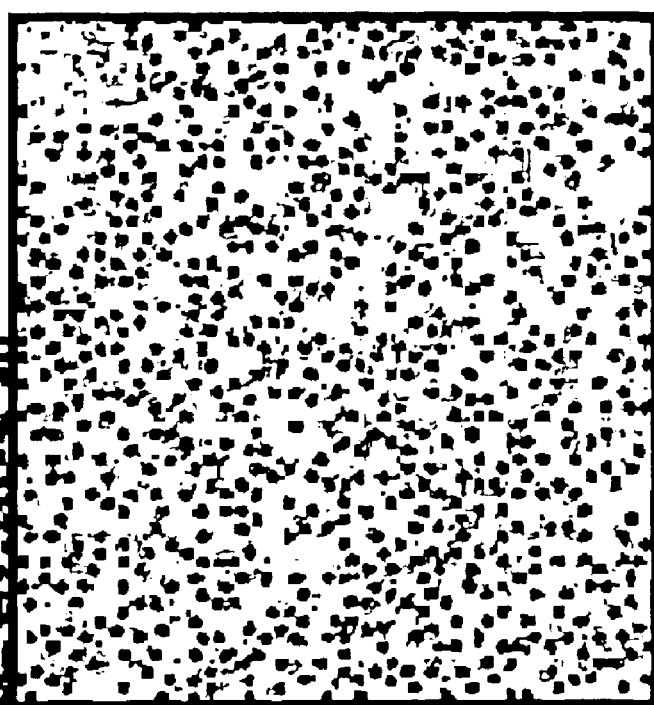
FIGS. 5(a) and (b) are illustrative diagrams of a network of nodes showing an "even-out" behavior.
Figure 5A:
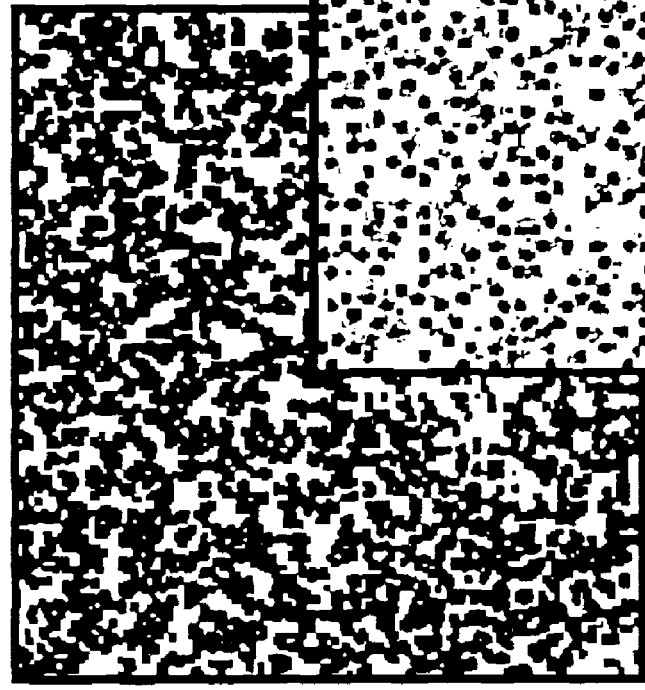

Create First Bands Operation—As shown in FIGS. 5(a), 5(b), and 5(c), to create a first set of bands, a center band is initiated using directed diffusion. As shown in FIG. 5(a), a first band type 500 is propagated along the gradient created by the gradient diffusion operation. This center band then initiates the formation of bands of a different type 502 on each of its sides, as shown in FIG. 5(b). This process continues, as shown in FIG. 5(c) until all bands of the first set are generated.

Create Second Bands Operation—As shown in FIGS. 6(a) and 6(b), an initial band is formed as a center band and other bands are formed in the same manner as the first set of bands, except that the bands (in this case) are formed orthogonally with respect to the first set.

Figure 7B:
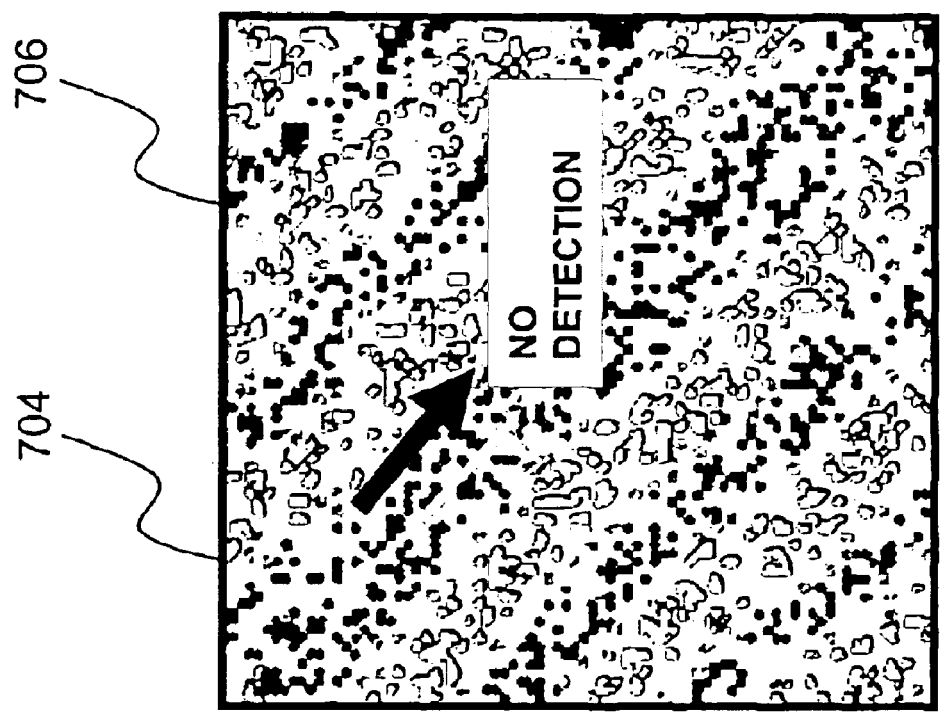
FIGS. 7(a) and (b) are illustrative diagrams of a network of nodes showing the creation of a second set of bands within a network of nodes.
Figure 7A:
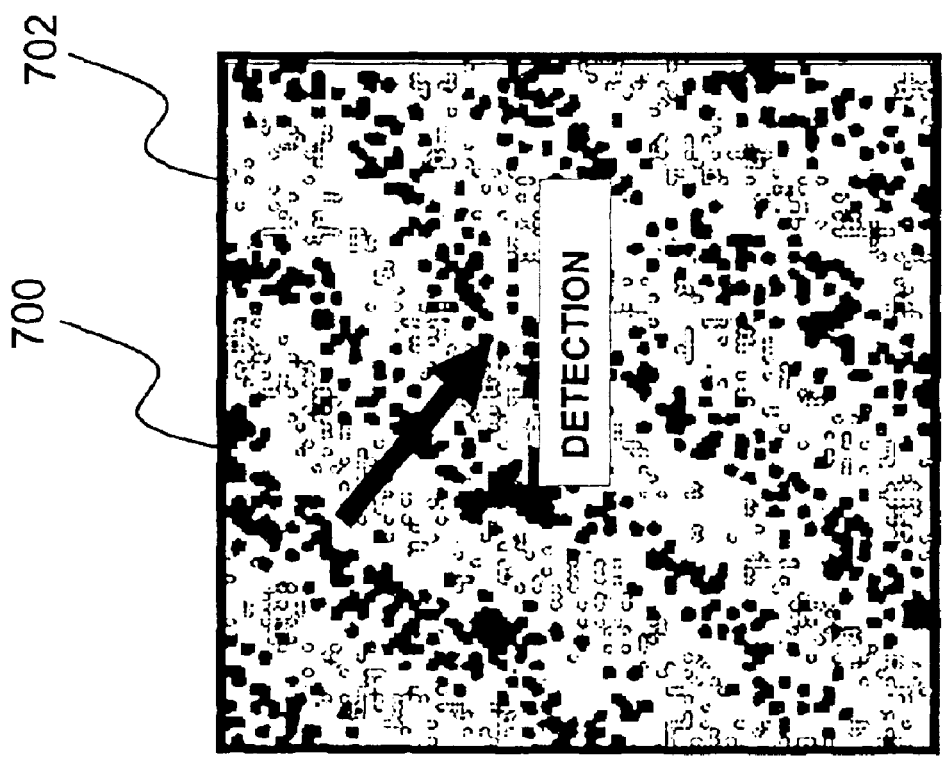

Detection Operation—FIGS. 7(a), (b), and (c) illustrate the detection operation, which includes sensitization of nodes around an object as it enters the array, coupled with the propagation of an alert signal in the direction of the object's motion. As shown in FIG. 7(a), as the object enters the array, nodes that detect the object transmit short-range priming messages. Nodes that receive the message and that lie in a different band than the node that sent out the message become sensitized to the possibility of an approaching object. These sensitized edge nodes are depicted in FIG. 7(b). If a sensitized node detects the object within a certain period of time, it transmits an alert signal in the direction of the object's motion, as shown in FIG. 7(c). Nodes that are sensitized typically remain in such a state for a predetermined length of time.

Reinforcement Operation—This operation is illustrated sequentially in FIGS. 8(a), (b), and (c). The initial alert message that a node sends out is weak and does not travel far. However, if the object continues to move in the same direction, the message is reinforced at receiving nodes and propagates further.

B. Further Details

Additional details regarding the steps for generating the virtual pattern, for detecting and monitoring movement, and for sending out the alert signal are now presented. Initially, basic definitions associated with various sensor states are given. Next, some non-application specific primitives are provided. Then, more detailed steps of the techniques are discussed. Finally, details regarding other example capabilities of the network of the present invention are presented.

i. Sensor State and Pheromones

A sensor state is composed of three sub-states—a pattern state, an activation state, and an observation state. Interactions between these sub-states determine system behavior. The pattern state and the activation state of a particular sensor node are determined by certain "pheromone types." The observation state is determined by sensor input.

The present invention makes use of a number of pheromone types. These pheromone types are subdivided into three categories: pattern pheromones, activation pheromones, and notification pheromones. The pheromones within a particular category are associated with a particular type of process in the system. Pattern pheromones are used to generate the pattern, activation pheromones are used in the monitoring process, and notification pheromones are used to generate notification at sensors along the predicted path of an object.

Each pheromone type has an associated set of rules that determine under what conditions messages of that particular type are sent out and accepted. These rules also determine the action that a sensor takes upon acceptance of a pheromone message. For certain pheromone types, the specific amount of pheromone that a sensor or message contains is used, where for other types, only the presence or absence of the pheromone is considered.

ii. Pattern State

The pattern state of a sensor is determined by the set of pattern-pheromones that the sensor possesses in nonzero amounts. The various pattern states of the sensors determine the virtual pattern that is embedded in the sensor network. A virtual pattern may be composed of a number of sub-patterns and pattern elements. A pattern element is defined to be an equivalence class consisting of all sensors that have the same pattern state. Sub-patterns are defined in the context of a particular application, and any one sub-pattern has an associated set of pheromones and its own set of pattern elements. For example, each set of bands (e.g., all bands oriented diagonally from the top right to the lower left in the figures) described previously would comprise a sub-pattern, while the set of an individual band type (e.g., every other band in the set of bands oriented diagonally from top right to lower left in the figures) would be a pattern element of one of these sub-patterns. The overall pattern shown in the figures consists of the overlay of these two sub-patterns and a pattern element of the overall pattern would be all squares that result from the intersection of all blue bands with all green bands. It is important to note that although two sub-patterns with two pattern elements each are shown, any number of each can be used in any desirable geometric configuration, and is not limited to the use of parallel stripes. Thus, it is to be understood that the present invention is not limited to the case shown. In a direct extension of the case just discussed, the patterns shown in the figures may consist of any number of overlaid stripe patterns. A stripe pattern consists of stripes, all having the same orientations, which are embedded in the network. There can be any number of pattern elements in a stripe pattern.

The nodes in different pattern elements generally emit different activation pheromones. Also, which activation pheromones are accepted by a node may be partially determined by which pattern element the node belongs to. Using this mechanism, it is possible to determine the approximate movement direction of an object. The activation state of a sensor node is determined by the activation pheromones that the node processes and the activation state has a similar definition to the pattern state, except that the vectors associated with the state use activation pheromones rather than pattern pheromones.

iii. Observation State

The observation state of a node is determined by the current sensor input, and is an indication of whether the node has detected an object. It may also be possible to extend the definition of observation state to include a record of the sensor input over some time window.

iv. Pheromones and General Primitives

A number of primitives have been developed that can be used with any algorithm within an amorphous network, and are not restricted for use in movement detection and prediction. As mentioned before, any suitable communication mechanism may be used for the communication between nodes and for setting up a virtual structure in the amorphous sensor network. Below, the data fields in a pheromone message used are presented.

(a) Pheromone Message Data Fields

A pheromone-type field is used to allow nodes to distinguish between different data types being passed. In this particular case, a type could be a sensitization type or an alert message type. Types can also be used to distinguish between different objects or different sensor types. For example, if patterns were established for two different sensor types (e.g., an infrared sensor and a chemical sensor), each pattern would operate using different pheromone-types for sensitization and alert messages for each sensor type. Additionally, a pheromone-amount field can be associated with each pheromone-type in order as an indication of the amount or strength associated with the pheromone-type. Thus, this field can be used to store a measure of the motion-persistence of an object as it traverses the network. The message signal intensity of a received message can also be used as a measure of distance between the nodes, and can augment the pheromone-amount field. For each pheromone type, each sensor maintains a number of variables that store information about the nodes sensor state with respect to the pheromone. Detail regarding these variables is provided below.

(b) Pheromone-Related Variables

A few useful variables for storing information related to the pheromone data fields just described are presented here.

Pheromone-amount is the virtual amount of the virtual pheromone contained by the sensor.

Maximum-allowed-pheromone-amount is the maximum virtual amount of the virtual pheromone that the sensor may contain.

Pheromone-accept-count is the number of times that the sensor has accepted a pheromone message containing the particular type of pheromone. This count may be reset.

Pheromone-send-count is the number of times the sensor has sent out a message that includes a pheromone of the particular type. This count may be reset.

A number of composite primitives that are composed of multiple primitives may also be useful. Distributed composite primitives are composite primitives involving operations that are distributed over multiple sensors. These primitives are discussed next.

(c) Composite Primitives

A gradient primitive is used to create a circular gradient of a particular pheromone type, centered at a single sensor as previously shown in FIG. 4. The pheromone type used to generate the path is referred to as the "gradient type." For discussion purposes, it is assumed that a single node initiates the process and starts with a nonzero amount of the gradient type pheromone, while all other sensors start with zero amounts. In this primitive, a sensor transmits a gradient type message some number of times if it contains a nonzero amount of the gradient type pheromone. The pheromone amount in the sent message is set to some percentage of the amount of gradient type pheromone the sending sensor contains. This percentage is referred to as a gradient percent. A sensor accepts a gradient type message if the pheromone amount in the message is larger than the amount of gradient type pheromone it contains. Upon acceptance of the message, it sets its gradient type pheromone amount to the amount in the message.

An even-out-distribution primitive is used to determine a subset of the sensors whose distribution is more uniform than the distribution of all sensors. In this primitive, one activation-pheromone is used. No other types are necessary. The type of this pheromone is referred to as the distribution-type. Two signal intensity ranges may also be used—small range and a large range. It is assumed that one or more widely dispersed sensors initiate the even-out process and that these sensors start with a nonzero amount of the distribution-type pheromone. The steps taken by this primitive are captured by the following pseudocode.

If (pheromone-amount(distribution-type)>0) AND (pheromone-send-count(distribution-type)=0) broadcast a distribution-type message.

If (pheromone-amount(distribution-type)=0) then accept a received distribution-type message if the message signal intensity is less than the large range and greater than the small range. Upon acceptance of a message, set pheromone-amount(distribution-type) to pheromone-amount in the message.

The directed-diffusion primitive is used to generate a path between a single sensor-node along a route of steepest ascent of a gradient, as depicted in FIG. 4(a). The pheromone type used for generating the path is referred to as the path-type. It is assumed that a single node initiates the process and starts with a nonzero amount of the path-type pheromone, while all other sensors start with zero amounts. In this primitive, a sensor sends a path-type message once it contains a nonzero amount of the path-type pheromone. The pheromone amount in the sent message is set to the amount of gradient type pheromone the sending sensor contains. A sensor accepts a path-type message if it contains nearly as much gradient type pheromone as (amount of path-type received)*(1/gradient percent). Upon acceptance of the message, the sensor sets its path-type pheromone amount to nonzero.

The generate-median-line primitive is used to generate a line along a boundary between two gradients. For simplicity of discussion, it is assumed that two gradient fields have been generated using two different pheromone types. To generate the center band, a gradient is initiated at the sensors that initiated the two gradients. Any sensor that receives a nearly equal amount of the two pheromone types for these gradients sets the appropriate stripe pattern pheromone to a nonzero and becomes part of the center band. A parameter is provided that determines how close the amounts of these two pheromones must be and the value of this parameter determines the width of the band.

There are additional primitives that can be used if the sensors have directional capabilities. If a sensor has this capability, then it can determine from which direction it received a message containing the largest amount of a particular pheromone type. This ability can be used to generate a path up a gradient field. In this case, when a sensor sends out a path-type pheromone, it is sent in the direction of the strongest detected gradient type pheromone. Also, a sensor only accepts a path-type pheromone message if it contains a zero amount of this pheromone type and if the message comes from the direction of the weakest detected gradient type pheromone.

v. Band Formation

Now, more detail regarding the band formation process is presented. Steps for generating the first set of bands in the situation shown in the figures are provided below. As an optional, preliminary step, the even-out-distribution primitive is applied, and all of the subsequent steps are restricted to the subset of nodes that are activated by this primitive. This generally results in bands that are somewhat more even, but it is not a necessary step.

First, a gradient is generated using the directed-diffusion primitive to initiate the formation of the center band, as was shown in FIG. 5(a). The sensors in the path up the gradient become the initial sensors in the resulting pattern element. As the first path is forming, the sensors fatten the initial path by sending pattern pheromone messages of this first type. Such messages are accepted if their signal intensities are above a predetermined threshold. The threshold is a parameter that determines how wide the band will be.

As the fattened center band is forming, sensors in this band send out pheromone messages of the pattern pheromone type to specify the second type pattern element, as shown in FIG. 5(b). Thus, alternate-type pattern bands are formed to either side of the fattened center band. A sensor accepts this alternate (second) pheromone if its signal intensity is above some specified threshold and if the sensor does not contain any of the pheromone (first) type for the center band.

As the alternate bands are forming, sensors in the second-type bands send out pheromone messages of the original (first) pattern pheromone type to create bands of the first type along side the bands of the second type, as shown in FIG. 5(c). This process repeats across the network, and is repeated again to form the orthogonal bands using third and fourth types.

During the formation of the orthogonal bands, the process is the same except for the process that initiates the center band. This initial band is shown in FIG. 6(a). To generate this center band, a generate-median-line primitive is used with a gradient initiated at each end of the center band in the first set of bands. Any sensor that receives a nearly equal amount of the two pheromone types for these gradients sets the third type of pattern pheromone to a nonzero value and becomes part of the center band. There is a parameter that determines how close the amounts of these two pheromones must be and the size of this parameter determines the width of the band.

vi. Motion Prediction

More detail is now presented regarding the motion prediction process. Pattern state, activation state, and observation state are all used in this process. In the example case discussed herein, and as previously mentioned, in the two sets of orthogonal bands, there are four different pattern states that a sensor can have. These pattern states are determined by which pattern element in each of the band sets the sensor belongs to. These states are referred to as P1B1/P2B1, P1B1/P2B2, P1B2/P2B1, and P1B2/P2B2, respectively with "P" indicating the pattern and "B" indicating the band to which a sensor belongs (note each of the states represents the intersection of a band from each pattern).

(a) Sensor Activation

If a sensor detects an object, it sends out a priming activation pheromone message, as was shown in FIG. 7(a). The pheromone type of this signal depends on the pattern state of the sensor. All sensors that receive this pheromone accept it and these sensors become sensitized to the possibility of an approaching object, as shown in FIG. 7(b).

If a sensitized sensor detects the object within some short period of time, it becomes activated, as shown in FIG. 7(c), and transmits a warning activation pheromone message. The pheromone type of this message depends on the pheromone type of the priming activation pheromone and the pattern state of the sensor. A sensor accepts the warning activation pheromone if it is not currently activated and if it has an appropriate pattern state. For example, if the pheromone type of the priming pheromone is determined by a P1B1 state, and a sensor sending the warning pheromone has a P1B1/P2B2 pattern state and the sensor sending the warning pheromone has a P1B2/P2B2 pattern state, then the appropriate patterns states for accepting a warning activation would be P1B1/P2B2 and P1B1/P2B2. Where the priming message is short-range, the warning message is relayed forward in the direction of the object's estimated travel and the pattern is used to guide the message propagation. If a sensor has been recently activated and has sent a warning message, then it will not accept or relay a warning message of the same pheromone type as the warning type that it sent. This ensures that the warning is propagated in the direction of travel and not propagated backward. The amount of time that is needed after a sensor is activated and before it will send out another warning of the same pheromone is a predetermined parameter.

(b) Warning Reinforcement

The amount of warning (alert) pheromone in an initial warning (alert) message sent out by an activated sensor depends on the amount of warning pheromone of the same type that the sensor contains. When an object is first detected, or if it has just changed its travel direction, the amount of pheromone in the warning message is small. When it is related, the pheromone amount in a message is decreased by a certain value (typically a percentage). The distance a warning message is relayed depends on the amount of pheromone in the message so that a message starting with a small amount of pheromone does not travel far, as shown in FIG. 8(a). Upon acceptance of a warning message, a sensor adds the pheromone amount in the message to its existing pheromone amount. Thus, as an object continues to travel in a particular direction, there is an accumulation of warning pheromone at sensor nodes along its anticipated path. In this way, as shown sequentially in FIGS. 8(a)–(c), the warning is reinforced and extended as the object continues in the same direction.

There is also a decay of the priming and warning pheromones that a sensor contains. Thus, if an object changes course, any warning pheromone that indicates the previous path will decay away. The strength of the warning pheromone at one particular sensor is an indication of the probability that the object is headed in that direction. The decay rate, the percentage propagated, and the initial warning pheromone amount are parameters that may depend, in part, on the estimated speed and course consistency.

It is important to note that the present invention may be extended to use any geometric "mesh" pattern for detection, and that linear bands are merely one such pattern, as would be recognized by one of skill in the art. Further, as would be recognized by one of skill in the art, it is contemplated that the particular techniques used for evening-out the nodes as well as for generating the "mesh" pattern may be performed in many different ways. Additionally, it is contemplated that a variety of learning algorithms may be incorporated with a network of the present invention to determine the various parameters in order to optimize the performance for various situations.

What is claimed is:

1. A method for detecting motion within an amorphous sensor node array, the method comprising steps of:

detecting an object at a node in the array, with a node that detects an object termed a "detecting node";

sensitizing nodes about the detecting node to the possibility that the object will move toward the sensitized nodes;

when the object moves toward a sensitized node, detecting the object at the sensitized node and propagating a warning signal to a distance from the sensitized node in the direction of the motion of the object.

2. A method as set forth in claim 1, further comprising a step of differentiating the nodes into a pattern comprising pattern elements, where each pattern element comprises at least one node, wherein the pattern is used to determine which nodes are sensitized about a detecting node and to determine a propagation direction for the warning signal.

3. A method as set forth in claim 2, wherein:

the step of differentiating the nodes into a pattern is performed by differentiating a plurality of nodes into a plurality of differently oriented, overlapping sets of substantially parallel linear bands with each set of substantially parallel linear bands having a repeated band arrangement of N ordered bands to form a mesh pattern including mesh points defined by intersections of linear bands from differently oriented overlapping sets, wherein mesh points having common band combinations are considered mesh points with nodes of a particular state;

the step of detecting an object at a node in the array is performed for determining when an object enters a mesh point in the sensor node array;

the step of sensitizing nodes is performed by propagating a sensitizing signal from nodes in the mesh point at which the object was detected to cause nodes in mesh points having states different from the state of the propagating mesh point within a distance of the propagating mesh point to become sensitized;

the steps of detecting an object at a sensitized node and propagating a warning signal are performed by detecting when the object enters a sensitized mesh point, and propagating a warning signal along nodes in a linear band that crosses the sensitized mesh point the object entered and that is substantially aligned with the motion of the object, so that the warning signal is propagated to a distance from the mesh point in the general direction of the object's travel.

4. A method as set forth in claim 3, wherein:

in the step of sensitizing nodes, the sensitized nodes record the state of the mesh point that sent the sensitizing signal;

in the step of detecting an object at the sensitized node, the sensitized node propagates a warning signal that includes a pheromone determined by a combination of the state of the node that sent the sensitizing signal and the state of the sensitized node;

in the step of propagating a warning signal, nodes that contain either the state of the node that sent the sensitizing signal or the state of the sensitized node become warning nodes, retransmitting the warning signal with a decay factor so that the initial strength of the warning signal determines the distance to which the warning signal is propagated.

5. A method as set forth in claim 4, further comprising the steps of:

determining a persistence measure for an object moving through the array, with the persistence measure being indicative of the distance of the object's travel along a particular linear band; and determining an initial strength for the warning signal to be propagated from the mesh point based on the persistence measure for the object, thereby varying the at least one parameter of the warning signal, with the parameter selected from a group consisting of a propagation distance of the warning signal and a warning intensity of the warning signal.

6. A method as set forth in claim 5, further comprising an initial step of selecting a subset of nodes in the array that are substantially evenly spaced with respect to each other for the differentiating step.

7. A method as set forth in claim 6, further comprising a step of detecting an object type.

8. A method as set forth in claim 7, further comprising a step of adjusting parameters of the steps of detecting, sensitizing, and propagating are adjusted for the particular object type.

9. A method as set forth in claim 8, further comprising adjusting the pattern based on the object type.

10. A method as set forth in claim 9, wherein the pattern is a three-dimensional pattern.

11. A method as set forth in claim 10, wherein nodes receiving a warning signal activate an action mechanism based on the warning signal.

12. A method as set forth in claim 1, wherein:
in the step of sensitizing nodes, the sensitized nodes record the state of the node that sent the sensitizing signal;
in the step of detecting an object at the sensitized node, the sensitized node propagates a warning signal that includes a pheromone determined by a combination of the state of the node that sent the sensitizing signal and the state of the sensitized node;
in the step of propagating a warning signal, nodes that contain either the state of the node that sent the sensitizing signal or the state of the sensitized node become warning nodes, retransmitting the warning signal with a decay factor so that the initial strength of the warning signal determines the distance to which the warning signal is propagated.

13. A method as set forth in claim 1, further comprising the steps of:
determining a persistence measure for an object moving through the array, with the persistence measure being indicative of the distance of the object's travel along a particular path; and
determining an initial strength for the warning signal to be propagated based on the persistence measure for the object, thereby varying the at least one parameter of the warning signal, with the parameter selected from a group consisting of a propagation distance of the warning signal and a warning intensity of the warning signal.

14. A method as set forth in claim 1, further comprising an initial step of selecting a subset of nodes in the array that are substantially evenly spaced with respect to each other for the differentiating step.

15. A method as set forth in claim 1, further comprising a step of detecting an object type.

16. A method as set forth in claim 15, further comprising a step of adjusting parameters of the steps of detecting, sensitizing, and propagating are adjusted for the particular object type.

17. A method as set forth in claim 1, wherein nodes receiving a warning signal activate an action mechanism based on the warning signal.

18. A method as set forth in claim 2, further comprising a step of detecting an object type.

19. A method as set forth in claim 18, further comprising adjusting the pattern based on the object type.

20. A method as set forth in claim 2, wherein the pattern is a three-dimensional pattern.

21. A computer program product for detecting motion within an amorphous sensor node array, the computer program product comprising means, recorded in a computer recordable medium for:
detecting an object at a node in the array, with a node that detects an object termed a "detecting node";
sensitizing nodes about the detecting node to the possibility that the object will move toward the sensitized nodes;
when the object moves toward a sensitized node, detecting the object at the sensitized node and propagating a warning signal to a distance from the sensitized node in the direction of the motion of the object.

22. A computer program product as set forth in claim 21, further comprising means for differentiating the nodes into a pattern comprising pattern elements, where each pattern element comprises at least one node, wherein the pattern is used to determine which nodes are sensitized about a detecting node and to determine a propagation direction for the warning signal.

23. A computer program product as set forth in claim 22, wherein:
the means for differentiating the nodes into a pattern operates by differentiating a plurality of nodes into a plurality of differently oriented, overlapping sets of substantially parallel linear bands with each set of substantially parallel linear bands having a repeated band arrangement of N ordered bands to form a mesh pattern including mesh points defined by intersections of linear bands from differently oriented overlapping sets, wherein mesh points having common band combinations are considered mesh points with nodes of a particular state;
the means for detecting an object at a node in the array operates for determining when an object enters a mesh point in the sensor node array;
the means for sensitizing nodes operates by propagating a sensitizing signal from nodes in the mesh point at which the object was detected to cause nodes in mesh points having states different from the state of the propagating mesh point within a distance of the propagating mesh point to become sensitized;
the means for detecting an object at a sensitized node and propagating a warning signal are performed by detecting when the object enters a sensitized mesh point, and propagating a warning signal along nodes in a linear band that crosses the sensitized mesh point the object entered and that is substantially aligned with the motion of the object, so that the warning signal is propagated to a distance from the mesh point in the general direction of the object's travel.

24. A computer program product as set forth in claim 23, wherein:
in the means for sensitizing nodes, the sensitized nodes record the state of the mesh point that sent the sensitizing signal;
in the means for detecting an object at the sensitized node, the sensitized node propagates a warning signal that includes a pheromone determined by a combination of the state of the node that sent the sensitizing signal and the state of the sensitized node;
in the means for propagating a warning signal, nodes that contain either the state of the node that sent the sensitizing signal or the state of the sensitized node become warning nodes, retransmitting the warning signal with a decay factor so that the initial strength of the warning signal determines the distance to which the warning signal is propagated.

25. A computer program product as set forth in claim 24, further comprising the means for:
determining a persistence measure for an object moving through the array, with the persistence measure being indicative of the distance of the object's travel along a particular linear band; and
determining an initial strength for the warning signal to be propagated from the mesh point based on the persistence measure for the object, thereby varying the at least one parameter of the warning signal, with the parameter selected from a group consisting of a propagation distance of the warning signal and a warning intensity of the warning signal.

26. A computer program product as set forth in claim 25, further comprising an initial means for selecting a subset of nodes in the array that are substantially evenly spaced with respect to each other for the differentiating means.

27. A computer program product as set forth in claim 26, further comprising means for detecting an object type.

28. A computer program product as set forth in claim 27, further comprising means for adjusting parameters of the means for detecting, sensitizing, and propagating are adjusted for the particular object type.

29. A computer program product as set forth in claim 28, further comprising adjusting the pattern based on the object type.

30. A computer program product as set forth in claim 29, wherein the pattern is a three-dimensional pattern.

31. A computer program product as set forth in claim 30, wherein nodes receiving a warning signal activate an action mechanism based on the warning signal.

32. A computer program product as set forth in claim 21, wherein:
in the means for sensitizing nodes, the sensitized nodes record the state of the node that sent the sensitizing signal;
in the means for detecting an object at the sensitized node, the sensitized node propagates a warning signal that includes a pheromone determined by a combination of the state of the node that sent the sensitizing signal and the state of the sensitized node;
in the means for propagating a warning signal, nodes that contain either the state of the node that sent the sensitizing signal or the state of the sensitized node become warning nodes, retransmitting the warning signal with a decay factor so that the initial strength of the warning signal determines the distance to which the warning signal is propagated.

33. A computer program product as set forth in claim 21, further comprising the means for:
determining a persistence measure for an object moving through the array, with the persistence measure being indicative of the distance of the object's travel along a particular path; and
determining an initial strength for the warning signal to be propagated based on the persistence measure for the object, thereby varying the at least one parameter of the warning signal, with the parameter selected from a group consisting of a propagation distance of the warning signal and a warning intensity of the warning signal.

34. A computer program product as set forth in claim 21, further comprising an initial means for selecting a subset of nodes in the array that are substantially evenly spaced with respect to each other for the differentiating means.

35. A computer program product as set forth in claim 21, further comprising means for detecting an object type.

36. A computer program product as set forth in claim 35, further comprising means for adjusting parameters of the means for detecting, sensitizing, and propagating are adjusted for the particular object type.

37. A computer program product as set forth in claim 21, wherein nodes receiving a warning signal activate an action mechanism based on the warning signal.

38. A computer program product as set forth in claim 22, further comprising means for detecting an object type.

39. A computer program product as set forth in claim 38, further comprising adjusting the pattern based on the object type.

40. A computer program product as set forth in claim 22, wherein the pattern is a three-dimensional pattern.

41. An amorphous sensor node array for detecting motion, the array comprising means for:
detecting an object at a node in the array, with a node that detects an object termed a "detecting node";
sensitizing nodes about the detecting node to the possibility that the object will move toward the sensitized nodes;
when the object moves toward a sensitized node, detecting the object at the sensitized node and propagating a warning signal to a distance from the sensitized node in the direction of the motion of the object.

42. An amorphous sensor node array as set forth in claim 41, further comprising means for differentiating the nodes into a pattern comprising pattern elements, where each pattern element comprises at least one node, wherein the pattern is used to determine which nodes are sensitized about a detecting node and to determine a propagation direction for the warning signal.

43. An amorphous sensor node array as set forth in claim 42, wherein:
the means for differentiating the nodes into a pattern operates by differentiating a plurality of nodes into a plurality of differently oriented, overlapping sets of substantially parallel linear bands with each set of substantially parallel linear bands having a repeated band arrangement of N ordered bands to form a mesh pattern including mesh points defined by intersections of linear bands from differently oriented overlapping sets, wherein mesh points having common band combinations are considered mesh points with nodes of a particular state;
the means for detecting an object at a node in the array operates for determining when an object enters a mesh point in the sensor node array;
the means for sensitizing nodes operates by propagating a sensitizing signal from nodes in the mesh point at which the object was detected to cause nodes in mesh points having states different from the state of the propagating mesh point within a distance of the propagating mesh point to become sensitized;
the means for detecting an object at a sensitized node and propagating a warning signal are performed by detecting when the object enters a sensitized mesh point, and propagating a warning signal along nodes in a linear band that crosses the sensitized mesh point the object entered and that is substantially aligned with the motion of the object, so that the warning signal is propagated to a distance from the mesh point in the general direction of the object's travel.

44. An amorphous sensor node array as set forth in claim 43, wherein:
in the means for sensitizing nodes, the sensitized nodes record the state of the mesh point that sent the sensitizing signal;
in the means for detecting an object at the sensitized node, the sensitized node propagates a warning signal that includes a pheromone determined by a combination of the state of the node that sent the sensitizing signal and the state of the sensitized node;

in the means for propagating a warning signal, nodes that contain either the state of the node that sent the sensitizing signal or the state of the sensitized node become warning nodes, retransmitting the warning signal with a decay factor so that the initial strength of the warning signal determines the distance to which the warning signal is propagated.

45. An amorphous sensor node array as set forth in claim 44, further comprising the means for:
   determining a persistence measure for an object moving through the array, with the persistence measure being indicative of the distance of the object's travel along a particular linear band; and
   determining an initial strength for the warning signal to be propagated from the mesh point based on the persistence measure for the object, thereby varying the at least one parameter of the warning signal, with the parameter selected from a group consisting of a propagation distance of the warning signal and a warning intensity of the warning signal.

46. An amorphous sensor node array as set forth in claim 45, further comprising an initial means for selecting a subset of nodes in the array that are substantially evenly spaced with respect to each other for the differentiating means.

47. An amorphous sensor node array as set forth in claim 46, further comprising means for detecting an object type.

48. An amorphous sensor node array as set forth in claim 47, further comprising means for adjusting parameters of the means for detecting, sensitizing, and propagating are adjusted for the particular object type.

49. An amorphous sensor node array as set forth in claim 48, further comprising adjusting the pattern based on the object type.

50. An amorphous sensor node array as set forth in claim 49, wherein the pattern is a three-dimensional pattern.

51. An amorphous sensor node array as set forth in claim 50, wherein nodes receiving a warning signal activate an action mechanism based on the warning signal.

52. An amorphous sensor node array as set forth in claim 41, wherein:
   in the means for sensitizing nodes, the sensitized nodes record the state of the node that sent the sensitizing signal;
   in the means for detecting an object at the sensitized node, the sensitized node propagates a warning signal that includes a pheromone determined by a combination of the state of the node that sent the sensitizing signal and the state of the sensitized node;
   in the means for propagating a warning signal, nodes that contain either the state of the node that sent the sensitizing signal or the state of the sensitized node become warning nodes, retransmitting the warning signal with a decay factor so that the initial strength of the warning signal determines the distance to which the warning signal is propagated.

53. An amorphous sensor node array as set forth in claim 41, further comprising the means for:
   determining a persistence measure for an object moving through the array, with the persistence measure being indicative of the distance of the object's travel along a particular path; and
   determining an initial strength for the warning signal to be propagated based on the persistence measure for the object, thereby varying the at least one parameter of the warning signal, with the parameter selected from a group consisting of a propagation distance of the warning signal and a warning intensity of the warning signal.

54. An amorphous sensor node array as set forth in claim 41, further comprising an initial means for selecting a subset of nodes in the array that are substantially evenly spaced with respect to each other for the differentiating means.

55. An amorphous sensor node array as set forth in claim 41, further comprising means for detecting an object type.

56. An amorphous sensor node array as set forth in claim 44, further comprising means for adjusting parameters of the means for detecting, sensitizing, and propagating are adjusted for the particular object type.

57. An amorphous sensor node array as set forth in claim 41, wherein nodes receiving a warning signal activate an action mechanism based on the warning signal.

58. An amorphous sensor node array as set forth in claim 42, further comprising means for detecting an object type.

59. An amorphous sensor node array as set forth in claim 58, further comprising adjusting the pattern based on the object type.

60. An amorphous sensor node array as set forth in claim 42, wherein the pattern is a three-dimensional pattern.

61. A node for operating within an amorphous sensor node array for detecting motion, the node comprising means for:
   waiting to detect an object;
   when the node detects an object, sensitizing nodes around the node to the possibility that the object will move toward the sensitized nodes;
   when the node is a sensitized node, and an object moves toward the node, detecting the object and propagating a warning signal to a distance from the node in the direction of the motion of the object.

62. A node as set forth in claim 61, further comprising means aiding in differentiating a network of nodes into a pattern comprising pattern elements, where each pattern element comprises at least one node, wherein the pattern is used to determine which nodes are sensitized about a detecting node and to determine a propagation direction for the warning signal.

63. A node as set forth in claim 62, wherein:
   the means for aiding in differentiating a network of nodes into a pattern operates by aiding in differentiating a plurality of nodes into a plurality of differently oriented, overlapping sets of substantially parallel linear bands with each set of substantially parallel linear bands having a repeated band arrangement of N ordered bands to form a mesh pattern including mesh points defined by intersections of linear bands from differently oriented overlapping sets, wherein mesh points having common band combinations are considered mesh points with nodes of a particular state;
   the means for detecting an object the node in the array operates for determining when an object enters a mesh point in the sensor node array;
   the means for sensitizing other nodes operates by propagating a sensitizing signal from the node in the mesh point at which the object was detected to cause nodes in mesh points having states different from the state of the propagating mesh point within a distance of the propagating mesh point to become sensitized;
   the means for detecting an object at the node when it is sensitized and propagating a warning signal are performed by detecting when the object approaches the node, and propagating a warning signal along nodes in a linear band that crosses the sensitized mesh point the object entered and that is substantially aligned with the motion of the object, so that the warning signal is propagated to a distance from the mesh point in the general direction of the object's travel.

64. A node as set forth in claim 63, wherein:
when sensitized, the node records the state of the mesh point that sent the sensitizing signal;
when detecting an object after being sensitized, the node propagates a warning signal that includes a pheromone determined by a combination of the state of the node that sent the sensitizing signal and the state of the node;
when propagating a warning signal, the node propagates the warning signal if it contains either the state of the node that sent the sensitizing signal or the state of the sensitized node, retransmitting the warning signal with a decay factor so that the initial strength of the warning signal determines the distance to which the warning signal is propagated.

65. A node as set forth in claim 64, further comprising the means for:
determining a persistence measure for an object moving through the array, with the persistence measure being indicative of the distance of the object's travel along a particular linear band; and
determining an initial strength for the warning signal to be propagated from the mesh point based on the persistence measure for the object, thereby varying the at least one parameter of the warning signal, with the parameter selected from a group consisting of a propagation distance of the warning signal and a warning intensity of the warning signal.

66. A node as set forth in claim 65, further comprising an initial means for assisting in selecting a subset of nodes in the array that are substantially evenly spaced with respect to each other for the differentiating means.

67. A node as set forth in claim 66, further comprising means for detecting an object type.

68. A node as set forth in claim 67, further comprising means for adjusting parameters of the means for detecting, sensitizing, and propagating for the particular object type.

69. A node as set forth in claim 68, further comprising means for assisting in adjusting the pattern based on the object type.

70. A node as set forth in claim 69, wherein the pattern is a three-dimensional pattern.

71. A node as set forth in claim 70, wherein when the node receives a warning signal, it activates an action mechanism based on the warning signal.

72. A node as set forth in claim 61, wherein:
when sensitized, the node records the state of the node that sent the sensitizing signal;
when detecting an object after being sensitized, the node propagates a warning signal that includes a pheromone determined by a combination of the state of the node that sent the sensitizing signal and the state of the node;
when propagating a warning signal, the node propagates the warning signal if it contains either the state of the node that sent the sensitizing signal or the state of the sensitized node, retransmitting the warning signal with a decay factor so that the initial strength of the warning signal determines the distance to which the warning signal is propagated.

73. A node as set forth in claim 61, further comprising the means for:
determining a persistence measure for an object moving through the array, with the persistence measure being indicative of the distance of the object's travel along a particular path; and
determining an initial strength for the warning signal to be propagated based on the persistence measure for the object, thereby varying the at least one parameter of the warning signal, with the parameter selected from a group consisting of a propagation distance of the warning signal and a warning intensity of the warning signal.

74. A node as set forth in claim 61, further comprising an initial means for assisting in selecting a subset of nodes in the array that are substantially evenly spaced with respect to each other for the differentiating means.

75. A node as set forth in claim 61, further comprising means for detecting an object type.

76. A node as set forth in claim 61, further comprising means for adjusting parameters of the means for detecting, sensitizing, and propagating for the particular object type.

77. A node as set forth in claim 61, wherein when the node receives a warning signal, it activates an action mechanism based on the warning signal.

78. A node as set forth in claim 62, further comprising means for detecting an object type.

79. A node as set forth in claim 78, further comprising means for assisting in adjusting the pattern based on the object type.

80. A node as set forth in claim 62, wherein the pattern is a three-dimensional pattern.

81. A computer program product for operating a node within an amorphous sensor node array for detecting motion, the computer program product comprising means, recorded on a computer readable medium for:
waiting to detect an object;
when the node detects an object, sensitizing nodes around the node to the possibility that the object will move toward the sensitized nodes;
when the node is a sensitized node, and an object moves toward the node, detecting the object and propagating a warning signal to a distance from the node in the direction of the motion of the object.

82. A computer program product as set forth in claim 81, further comprising means for aiding in differentiating a network of nodes into a pattern comprising pattern elements, where each pattern element comprises at least one node, wherein the pattern is used to determine which nodes are sensitized about a detecting node and to determine a propagation direction for the warning signal.

83. A computer program product as set forth in claim 82, wherein:
the means for aiding in differentiating a network of nodes into a pattern operates by aiding in differentiating a plurality of nodes into a plurality of differently oriented, overlapping sets of substantially parallel linear bands with each set of substantially parallel linear bands having a repeated band arrangement of N ordered bands to form a mesh pattern including mesh points defined by intersections of linear bands from differently oriented overlapping sets, wherein mesh points having common band combinations are considered mesh points with nodes of a particular state;
the means for detecting an object the node in the array operates for determining when an object enters a mesh point in the sensor node array;
the means for sensitizing other nodes operates by propagating a sensitizing signal from the node in the mesh point at which the object was detected to cause nodes in mesh points having states different from the state of the propagating mesh point within a distance of the propagating mesh point to become sensitized;
the means for detecting an object at the node when it is sensitized and propagating a warning signal are performed by detecting when the object approaches the node, and propagating a warning signal along nodes in a linear band that crosses the sensitized mesh point the object entered and that is substantially aligned with the motion of the object, so that the warning signal is propagated to a distance from the mesh point in the general direction of the object's travel.

84. A computer program product as set forth in claim 83, wherein:
when sensitized, the node records the state of the mesh point that sent the sensitizing signal;
when detecting an object after being sensitized, the node propagates a warning signal that includes a pheromone determined by a combination of the state of the node that sent the sensitizing signal and the state of the node;
when propagating a warning signal, the node propagates the warning signal if it contains either the state of the node that sent the sensitizing signal or the state of the sensitized node, retransmitting the warning signal with a decay factor so that the initial strength of the warning signal determines the distance to which the warning signal is propagated.

85. A computer program product as set forth in claim 84, further comprising the means for:
determining a persistence measure for an object moving through the array, with the persistence measure being indicative of the distance of the object's travel along a particular linear band; and
determining an initial strength for the warning signal to be propagated from the mesh point based on the persistence measure for the object, thereby varying the at least one parameter of the warning signal, with the parameter selected from a group consisting of a propagation distance of the warning signal and a warning intensity of the warning signal.

86. A computer program product as set forth in claim 85, further comprising an initial means for assisting in selecting a subset of nodes in the array that are substantially evenly spaced with respect to each other for the differentiating means.

87. A computer program product as set forth in claim 86, further comprising means for detecting an object type.

88. A computer program product as set forth in claim 87, further comprising means for adjusting parameters of the means for detecting, sensitizing, and propagating for the particular object type.

89. A computer program product as set forth in claim 68, further comprising means for assisting in adjusting the pattern based on the object type.

90. A computer program product as set forth in claim 89, wherein the pattern is a three-dimensional pattern.

91. A computer program product as set forth in claim 90, wherein when the node receives a warning signal, it activates an action mechanism based on the warning signal.

92. A computer program product as set forth in claim 81, wherein:
when sensitized, the node records the state of the node that sent the sensitizing signal;
when detecting an object after being sensitized, the node propagates a warning signal that includes a pheromone determined by a combination of the state of the node that sent the sensitizing signal and the state of the node;
when propagating a warning signal, the node propagates the warning signal if it contains either the state of the node that sent the sensitizing signal or the state of the sensitized node, retransmitting the warning signal with a decay factor so that the initial strength of the warning signal determines the distance to which the warning signal is propagated.

93. A computer program product as set forth in claim 81, further comprising the means for:
determining a persistence measure for an object moving through the array, with the persistence measure being indicative of the distance of the object's travel along a particular path; and
determining an initial strength for the warning signal to be propagated based on the persistence measure for the object, thereby varying the at least one parameter of the warning signal, with the parameter selected from a group consisting of a propagation distance of the warning signal and a warning intensity of the warning signal.

94. A computer program product as set forth in claim 81, further comprising an initial means for assisting in selecting a subset of nodes in the array that are substantially evenly spaced with respect to each other for the differentiating means.

95. A computer program product as set forth in claim 81, further comprising means for detecting an object type.

96. A computer program product as set forth in claim 95, further comprising means for adjusting parameters of the means for detecting, sensitizing, and propagating for the particular object type.

97. A computer program product as set forth in claim 81, wherein when the node receives a warning signal, it activates an action mechanism based on the warning signal.

98. A computer program product as set forth in claim 82, further comprising means for detecting an object type.

99. A computer program product as set forth in claim 98, further comprising means for assisting in adjusting the pattern based on the object type.

100. A computer program product as set forth in claim 82, wherein the pattern is a three-dimensional pattern.

101. A method for operating a node within an amorphous sensor node array for detecting motion, the method comprising steps of:
waiting to detect an object;
when the node detects an object, sensitizing nodes around the node to the possibility that the object will move toward the sensitized nodes;
when the node is a sensitized node, and an object moves toward the node, detecting the object and propagating a warning signal to a distance from the node in the direction of the motion of the object.

102. A method as set forth in claim 101, further comprising a step of aiding in differentiating a network of nodes into a pattern comprising pattern elements, where each pattern element comprises at least one node, wherein the pattern is used to determine which nodes are sensitized about a detecting node and to determine a propagation direction for the warning signal.

103. A method as set forth in claim 102, wherein:
the step of aiding in differentiating a network of nodes into a pattern is performed by aiding in differentiating a plurality of nodes into a plurality of differently oriented, overlapping sets of substantially parallel linear bands with each set of substantially parallel linear bands having a repeated band arrangement of N ordered bands to form a mesh pattern including mesh points defined by intersections of linear bands from differently oriented overlapping sets, wherein mesh points having common band combinations are considered mesh points with nodes of a particular state;

the step of detecting an object the node in the array is performed for determining when an object enters a mesh point in the sensor node array;

the step of sensitizing other nodes is performed by propagating a sensitizing signal from the node in the mesh point at which the object was detected to cause nodes in mesh points having states different from the state of the propagating mesh point within a distance of the propagating mesh point to become sensitized;

the step of detecting an object at the node when it is sensitized and propagating a warning signal are performed by detecting when the object approaches the node, and propagating a warning signal along nodes in a linear band that crosses the sensitized mesh point the object entered and that is substantially aligned with the motion of the object, so that the warning signal is propagated to a distance from the mesh point in the general direction of the object's travel.

104. A method as set forth in claim 103, wherein:

when sensitized, the node records the state of the mesh point that sent the sensitizing signal;

when detecting an object after being sensitized, the node propagates a warning signal that includes a pheromone determined by a combination of the state of the node that sent the sensitizing signal and the state of the node;

when propagating a warning signal, the node propagates the warning signal if it contains either the state of the node that sent the sensitizing signal or the state of the sensitized node, retransmitting the warning signal with a decay factor so that the initial strength of the warning signal determines the distance to which the warning signal is propagated.

105. A method as set forth in claim 104, further comprising the step of:

determining a persistence measure for an object moving through the array, with the persistence measure being indicative of the distance of the object's travel along a particular linear band; and determining an initial strength for the warning signal to be propagated from the mesh point based on the persistence measure for the object, thereby varying the at least one parameter of the warning signal, with the parameter selected from a group consisting of a propagation distance of the warning signal and a warning intensity of the warning signal.

106. A method as set forth in claim 105, further comprising an initial step of assisting in selecting a subset of nodes in the array that are substantially evenly spaced with respect to each other for the differentiating means.

107. A method as set forth in claim 106, further comprising step of detecting an object type.

108. A method as set forth in claim 107, further comprising step of adjusting parameters of the step of detecting, sensitizing, and propagating for the particular object type.

109. A method as set forth in claim 108, further comprising step of assisting in adjusting the pattern based on the object type.

110. A method as set forth in claim 109, wherein the pattern is a three-dimensional pattern.

111. A method as set forth in claim 100, wherein when the node receives a warning signal, it activates an action mechanism based on the warning signal.

112. A method as set forth in claim 101, wherein:

when sensitized, the node records the state of the node that sent the sensitizing signal;

when detecting an object after being sensitized, the node propagates a warning signal that includes a pheromone determined by a combination of the state of the node that sent the sensitizing signal and the state of the node;

when propagating a warning signal, the node propagates the warning signal if it contains either the state of the node that sent the sensitizing signal or the state of the sensitized node, retransmitting the warning signal with a decay factor so that the initial strength of the warning signal determines the distance to which the warning signal is propagated.

113. A method as set forth in claim 101, further comprising the step of:

determining a persistence measure for an object moving through the array, with the persistence measure being indicative of the distance of the object's travel along a particular path; and determining an initial strength for the warning signal to be propagated based on the persistence measure for the object, thereby varying the at least one parameter of the warning signal, with the parameter selected from a group consisting of a propagation distance of the warning signal and a warning intensity of the warning signal.

114. A method as set forth in claim 101, further comprising an initial step of assisting in selecting a subset of nodes in the array that are substantially evenly spaced with respect to each other for the differentiating means.

115. A method as set forth in claim 101, further comprising step of detecting an object type.

116. A method as set forth in claim 115, further comprising step of adjusting parameters of the step of detecting, sensitizing, and propagating for the particular object type.

117. A method as set forth in claim 101, wherein when the node receives a warning signal, it activates an action mechanism based on the warning signal.

118. A method as set forth in claim 101, further comprising step of detecting an object type.

119. A method as set forth in claim 118, further comprising step of assisting in adjusting the pattern based on the object type.

120. A method as set forth in claim 101, wherein the pattern is a three-dimensional pattern.

* * * * *